(12) United States Patent
Walker

(10) Patent No.: US 8,132,868 B2
(45) Date of Patent: *Mar. 13, 2012

(54) HYDRAULIC REGENERATIVE BRAKING SYSTEM FOR A VEHICLE

(76) Inventor: Frank H. Walker, Grand Blanc, MI (US)

( * ) Notice: Subject to any disclaimer, the term of this patent is extended or adjusted under 35 U.S.C. 154(b) by 1304 days.

This patent is subject to a terminal disclaimer.

(21) Appl. No.: 11/721,903

(22) PCT Filed: Dec. 16, 2005

(86) PCT No.: PCT/US2005/045825
§ 371 (c)(1),
(2), (4) Date: Jun. 15, 2007

(87) PCT Pub. No.: WO2006/066156
PCT Pub. Date: Jun. 22, 2006

(65) Prior Publication Data
US 2008/0185909 A1    Aug. 7, 2008

Related U.S. Application Data

(60) Provisional application No. 60/654,048, filed on Feb. 18, 2005, provisional application No. 60/636,650, filed on Dec. 17, 2004.

(51) Int. Cl.
*B60T 8/64* (2006.01)
(52) U.S. Cl. .......... 303/152; 417/237; 91/491; 180/165
(58) Field of Classification Search .......... 303/10, 303/11, 116.3, 116.4, 152; 91/6.5, 472, 492, 91/491; 60/419; 417/237, 273; 418/132, 418/173, 61.3
See application file for complete search history.

(56) References Cited

U.S. PATENT DOCUMENTS

| 3,493,066 A | 2/1970 | Dooley |
| 3,734,222 A | 5/1973 | Bardwick, III |
| 3,760,691 A | 9/1973 | Kleckner et al. |

(Continued)

FOREIGN PATENT DOCUMENTS

DE    3538547 A1    5/1987

(Continued)

OTHER PUBLICATIONS

International Search Report, mailed Jul. 18, 2008, 1 page.

(Continued)

*Primary Examiner* — Bradley King
(74) *Attorney, Agent, or Firm* — Brooks Kushman P.C.

(57) ABSTRACT

A hydraulic regenerative braking system and method for a vehicle include a variable displacement hydraulic machine operable as a pump or a motor (22). The hydraulic machine facilitates connections between some of its piston cylinders (50, 52) and a low pressure source (32), and some other of its piston cylinders (50, 52) and a high pressure source (28). The cylinders are alternately connected to the high and low pressure sources such that a pressure transition occurs during each piston stroke. By controlling where in a piston stroke the transitions occur, the power of the hydraulic machine can be modulated. The hydraulic machine is configured to effect the pressure transitions in only a portion of the cylinders at one time. This can be accomplished by asymmetrically configuring cam lobes (86, 88, 90) and fluid ports (74, 76, 78, 80, 82, 84). Staggering the pressure transitions helps to inhibit flow disturbances in the machine when it is operating at less than full displacement.

25 Claims, 6 Drawing Sheets

U.S. PATENT DOCUMENTS

| | | |
|---|---|---|
| 3,796,136 A | 3/1974 | Oguni |
| 3,852,998 A | 12/1974 | Leeson |
| 3,908,519 A | 9/1975 | Born et al. |
| 3,910,043 A | 10/1975 | Clerk |
| 3,941,498 A | 3/1976 | Duckworth et al. |
| 4,031,420 A | 6/1977 | Carini |
| 4,051,765 A | 10/1977 | Saito |
| 4,208,921 A | 6/1980 | Keyes |
| 4,282,948 A | 8/1981 | Jerome |
| 4,297,086 A | 10/1981 | McGowan |
| 4,459,084 A | 7/1984 | Clark |
| 4,540,345 A | 9/1985 | Frazer |
| 4,883,141 A | 11/1989 | Walker |
| 4,934,251 A | 6/1990 | Barker |
| 4,993,780 A * | 2/1991 | Tanaka et al. .................... 303/3 |
| 5,000,282 A | 3/1991 | Walker |
| 5,101,925 A | 4/1992 | Walker |
| 5,211,015 A | 5/1993 | Schroeder |
| 5,215,124 A | 6/1993 | Hattori et al. |
| 5,263,401 A | 11/1993 | Walker |
| 5,323,688 A | 6/1994 | Walker |
| 5,473,893 A | 12/1995 | Achten et al. |
| 5,482,445 A | 1/1996 | Achten et al. |
| 5,507,144 A | 4/1996 | Gray, Jr. et al. |
| 5,540,193 A | 7/1996 | Achten et al. |
| 5,556,262 A | 9/1996 | Achten et al. |
| 5,829,393 A | 11/1998 | Achten et al. |
| 5,839,889 A | 11/1998 | Folsom et al. |
| 5,944,493 A | 8/1999 | Albertin et al. |
| 5,971,092 A | 10/1999 | Walker |
| 5,983,638 A | 11/1999 | Achten et al. |
| 6,024,420 A | 2/2000 | Yonemura et al. |
| 6,033,040 A | 3/2000 | Inagaki et al. |
| 6,116,138 A | 9/2000 | Achten |
| 6,116,871 A | 9/2000 | Backe et al. |
| 6,142,581 A | 11/2000 | Yamaguchi et al. |
| 6,206,656 B1 | 3/2001 | Bailey et al. |
| 6,223,529 B1 | 5/2001 | Achten |
| 6,279,517 B1 | 8/2001 | Achten |
| 6,336,518 B1 | 1/2002 | Matsuyama |
| 6,349,543 B1 | 2/2002 | Lisniansky |
| 6,374,602 B1 | 4/2002 | Prabhu et al. |
| 6,446,435 B1 | 9/2002 | Willmann et al. |
| 6,470,677 B2 | 10/2002 | Bailey |
| 6,537,047 B2 | 3/2003 | Walker |
| 6,575,076 B1 | 6/2003 | Achten |
| 6,623,260 B2 | 9/2003 | White |
| 6,641,232 B1 | 11/2003 | Alaze |
| 6,719,080 B1 | 4/2004 | Gray, Jr. |
| 6,758,295 B2 | 7/2004 | Fleming |
| 6,773,368 B1 | 8/2004 | Williames |
| 6,811,510 B1 | 11/2004 | Langenfeld et al. |
| 6,905,321 B2 | 6/2005 | Uchiyama et al. |
| 7,562,944 B2 | 7/2009 | Walker |
| 7,926,605 B1 * | 4/2011 | Otterstrom .................... 180/165 |
| 2001/0036411 A1 | 11/2001 | Walker |
| 2002/0043884 A1 | 4/2002 | Hunter |
| 2002/0163173 A1 | 11/2002 | Ruehl et al. |
| 2006/0055238 A1 | 3/2006 | Walker |
| 2006/0061080 A1 | 3/2006 | Luttinen et al. |
| 2008/0210500 A1 | 9/2008 | Walker |
| 2010/0101406 A1 | 4/2010 | Walker |

FOREIGN PATENT DOCUMENTS

| | | |
|---|---|---|
| JP | 57127154 A | 8/1982 |
| JP | 63085265 A | 4/1988 |
| JP | 8-144927 | 6/1996 |
| WO | 2004058550 A3 | 7/2004 |

OTHER PUBLICATIONS

Peter A.J. Achten et al., Transforming Future Hydraulics: A New Design of a Hydraulic Transformer, Abstract, reprint from Proceedings of the Fifth Scandinavian International Conference on Fluid Power, 1997, part 3, Linkoeping University, 1 page.

Peter A.J. Achten et al., What a Difference a Hole Makes—The Commercial Value of the Innas Hydraulic Transformer, Abstract, The Sixth Scandinavian International Conference on Fluid Power, May 26-29, 1999, Tampere, Finland, 1 page.

Georges Vael et al., Cylinder Control With the Floating Cup Hydraulic Transformer, The Eighth Scandinavian International Conference on Fluid Power, May 7-9, 2003, Tampere, Finland, 16 pages.

Peter Achten et al., Design and Testing of an Axial Piston Pump Based on the Floating Cup Principle, The Eighth Scandinavian International Conference on Fluid Power, May 7-9, 2003, Tampere, Finland, 16 pages.

Rob A.H. van Malsen et al., Design of Dynamic and Efficient Hydraulic Systems Around a Simple Hydraulic Grid, 2002, SAE 2002-01-1432, pp. 1-9.

Georges E.M. Vael et al., The Innas Hydraulic Transformer—The Key to the Hydrostatic Common Pressure Rail, 2000, SAE 2000-01-2561, 16 pages.

R. P. Kepner, Hydraulic Power Assist—A Demonstration of Hydraulic Hybrid Vehicle Regenerative Braking in a Road Vehicle Application, SAE Technical Paper Series, 2002, SAE 2002-01-3128, 8 pages.

Peter A.J. Achten et al., 'Shuttle' technology for noise reduction and efficiency improvement of hydrostatic machines, The Seventh Scandinavia International Conference on Fluid Power, 2001, Linkoeping, Sweden, pp. 1-4.

Peter A.J. Achten et al., Valving Land Phenomena of the Innas Hydraulic Transformer, Abstract, 1 page, 1999.

G.E.M. Vael et al., Some Design Aspects of the Floating Cup Hydraulic Transformer, 16 pages, 2003.

Peter A.J.Achten, Designing the impossible pump, pp. 1-15, 2003.

Design News, Hydraulic Motor Adds Speed Equipment, Apr. 26, 2004, p. 38.

* cited by examiner

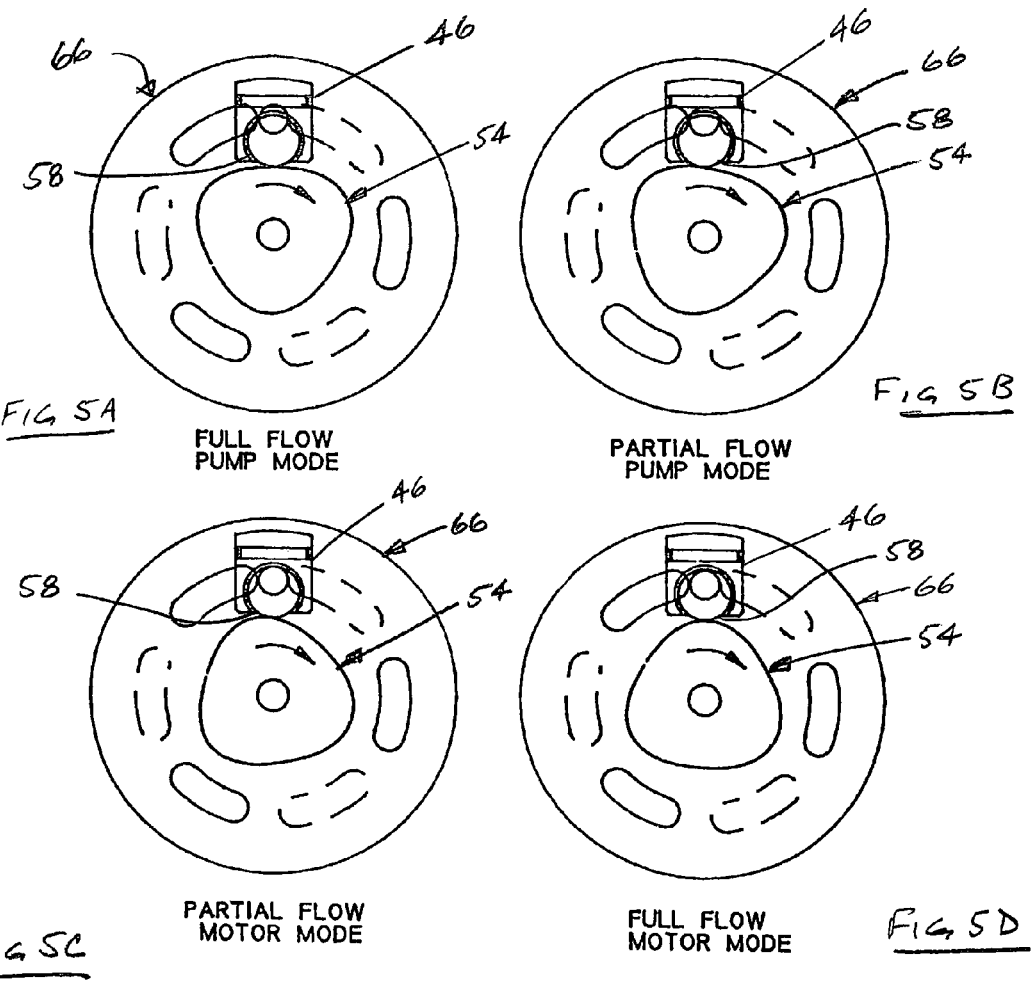

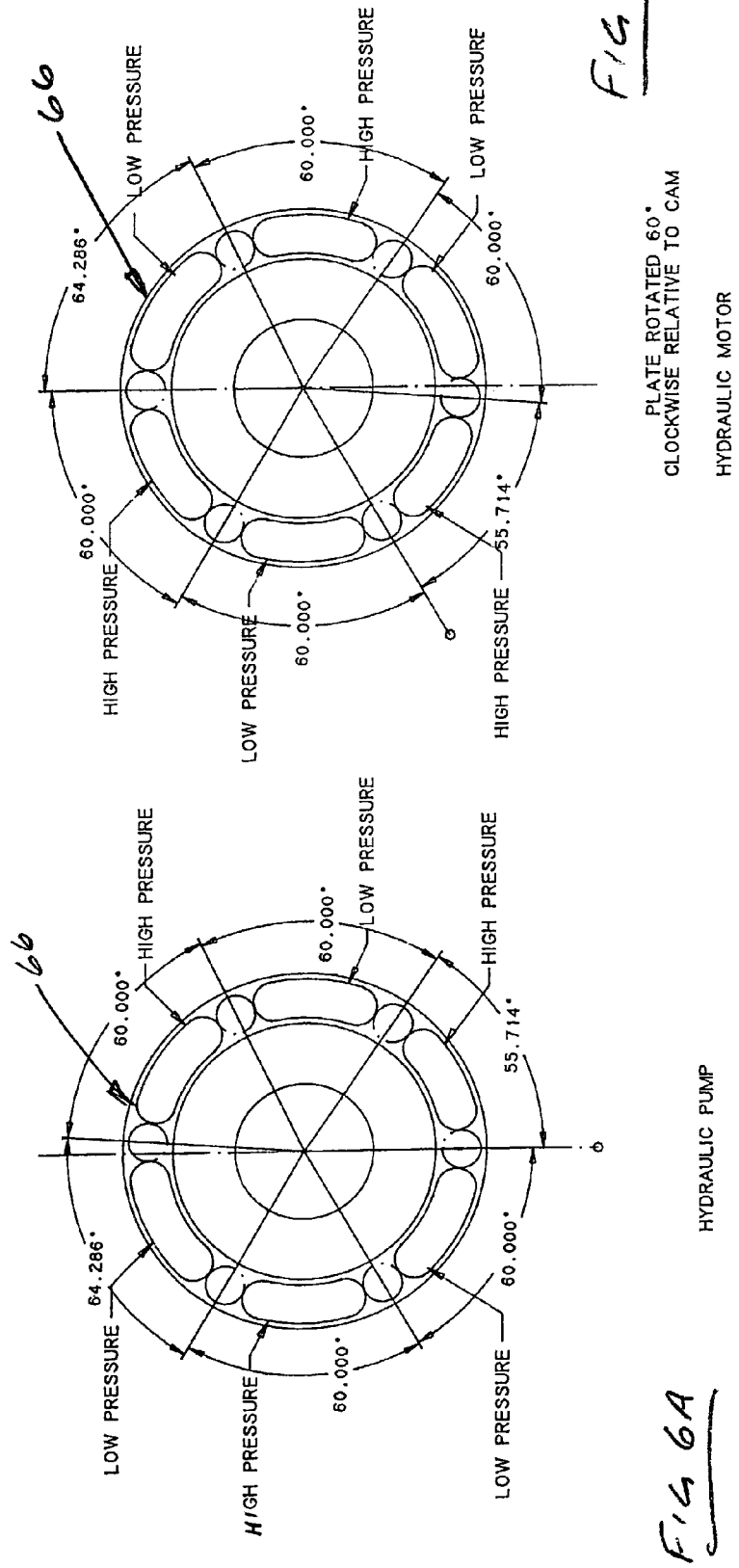

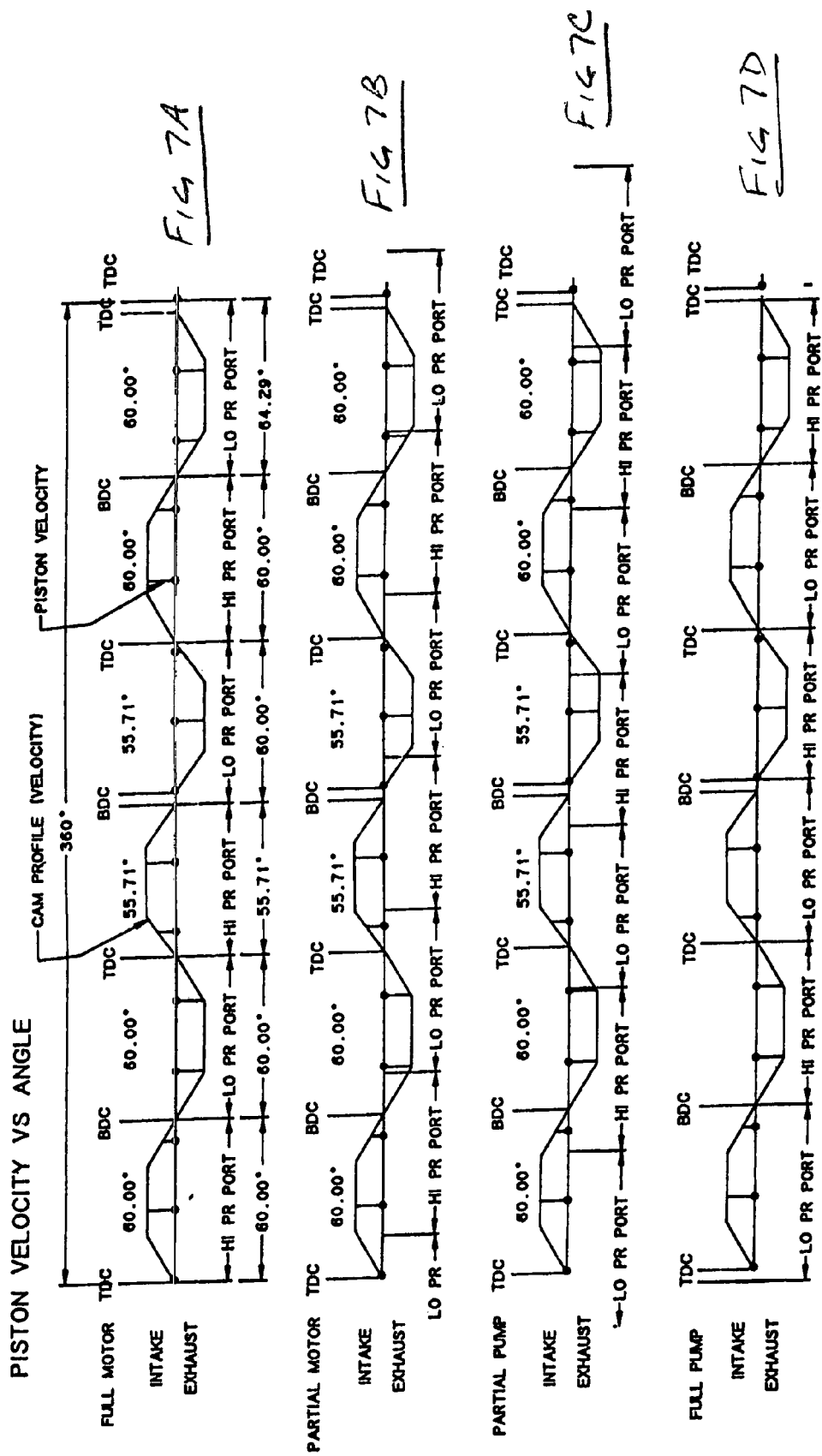

HYDRAULIC REGENERATIVE BRAKING SYSTEM FOR A VEHICLE

CROSS-REFERENCE TO RELATED APPLICATIONS

This application claims the benefit of U.S. provisional application Ser. No. 60/636,650 filed Dec. 17, 2004, and U.S. provisional application Ser. No. 60/654,048 filed Feb. 18, 2005, each of, which is hereby incorporated herein by reference.

BACKGROUND OF THE INVENTION

1. Field of the Invention

The present invention relates to a hydraulic regenerative braking system and method for a vehicle.

2. Background Art

It is well known that hydraulic regenerative systems promise improved efficiency over electric regenerative systems incorporating a battery. Hydraulic regeneration involves using a pump connected in the vehicle drive train as a retarding device, and then storing the resulting high pressure fluid in an accumulator. On subsequent vehicle acceleration, the high pressure fluid from the accumulator is routed to a hydraulic motor and the stored energy is recovered in the form of mechanical work which drives the vehicle forward. A low pressure accumulator acts as a reservoir to make up for fluid volume variations within the high pressure accumulator, and also provides a charge pressure to the inlet side of the pump.

One method of modulating braking and driving forces in hydraulic regenerative systems is to incorporate a variable displacement device to operate in concert with the fixed pressure accumulator. Conventional variable displacement hydraulic machines may vary the piston strokes to achieve the desired power modulation. Such devices can be bulky, heavy and expensive. Moreover, they do not package easily in automotive passenger vehicles, especially in the front of a vehicle, where space is limited.

One way to overcome the limitations associated with conventional variable displacement hydraulic machines is to use a fixed displacement machine. Such a machine is generally smaller and lighter than its variable displacement counterpart, but it does not allow the power modulation required in most applications. One solution to this problem is to use a fixed displacement hydraulic machine in conjunction with a variable ratio hydraulic transformer to facilitate the desired power modulation. One such system is described in U.S. patent application Ser. No. 10/535,354, entitled "Hydraulic Regenerative Braking System for a Vehicle," filed on May 18, 2005, which is hereby incorporated herein by reference. As an alternative, it would be desirable to have a system that included a relatively compact variable displacement hydraulic machine, thus eliminating the requirement of a separate variable ratio transformer.

Therefore, a need exists for a hydraulic regenerative braking system and method for a vehicle that uses a variable displacement hydraulic machine to provide control of power modulation, without consuming too much space in the vehicle powertrain.

SUMMARY OF THE INVENTION

Accordingly, the present invention provides a hydraulic regenerative braking system and method that conserves space by using one or more compact variable displacement hydraulic machines.

The invention also provides a hydraulic regenerative braking system and method that uses a hydraulic machine that effects modulation of its power by varying the amount of fluid pumped out of, or received by, the hydraulic machine.

The invention further provides a hydraulic regenerative braking system and method that staggers pressure changes in a variable displacement hydraulic machine to reduce flow disturbances.

The invention also provides a hydraulic regenerative braking system for a vehicle having a shaft connected to at least one wheel. The system includes a hydraulic machine operable as a pump configured to be driven by the shaft, thereby increasing the pressure of fluid flowing through the hydraulic machine. The hydraulic machine is further operable as a motor configured to be driven by pressurized fluid, thereby providing torque to the shaft. The hydraulic machine includes a housing having a high pressure fluid port and a low pressure fluid port, and also includes a plurality of radial pistons. Each of the pistons is configured to reciprocate within a corresponding cylinder in the housing, and has a corresponding piston stroke. The pistons pump fluid when the hydraulic machine is operating as a pump, and provide torque when the hydraulic machine is operating as a motor. Each of the pistons includes a corresponding cam follower. A cam is disposed within the housing, and has a plurality of lobes configured to cooperate with the cam followers to translate rotational motion of the cam into linear motion of the pistons when the hydraulic machine is operating as a pump, and to translate linear motion of the pistons into rotational motion of the cam when the hydraulic machine is operating as a motor. A valve plate includes a plurality of apertures therethrough, at least one of which communicates with the high pressure fluid port and at least one of which communicates with the low pressure fluid port. The valve plate is configured to connect at least one of the cylinders with the high pressure fluid port and at least one other of the cylinders with the low pressure fluid port. The valve plate is movable relative to the housing to effect a first transition to disconnect the at least one cylinder from the high pressure fluid port and connect it with the low pressure fluid port, and to effect a second transition to disconnect the at least one other cylinder from the low pressure fluid port and connect it with the high pressure fluid port. The valve plate is movable such that the first and second transitions can be effected at a plurality of piston positions within a corresponding piston stroke, thereby facilitating variable displacement operation of the hydraulic machine.

The invention further provides a hydraulic regenerative braking system for a vehicle that includes a first accumulator configured to receive fluid and store the fluid under pressure, and a second accumulator configured to store the fluid at a pressure lower than the pressure of the fluid in the first accumulator. A hydraulic machine is operable as a pump configured to be driven by energy received from at least one vehicle wheel when the vehicle is braking, thereby facilitating storage of vehicle braking energy. The hydraulic machine is further operable as a motor configured to be driven by stored braking energy, thereby providing torque to the at least one wheel. The hydraulic machine is configured to pump fluid into the first accumulator when operating as a pump, and to receive fluid from the first accumulator when operating as a motor. The hydraulic machine is further configured such that the amount of fluid pumped into the first accumulator during each cycle of the hydraulic machine can be varied, and the amount of fluid received from the first accumulator during each cycle of the hydraulic machine can be varied, thereby facilitating operation of the hydraulic machine as a variable displacement pump and as a variable displacement motor, respectively. The hydraulic regenerative braking system also includes a control system having at least one control module. The control system is configured to receive inputs related to the operation of the vehicle, and to control operation of the hydraulic machine.

The invention also provides a method for hydraulic regenerative braking of a vehicle. The vehicle includes a shaft connected to at least one wheel, first and second accumulators for storing and providing pressurized fluid, and a hydraulic machine. The hydraulic machine is operable as a pump configured to receive energy from the at least one wheel and pump fluid into the first accumulator, and further operable as a motor to receive pressurized fluid from the first accumulator and provide energy to the at least one wheel. The method includes operating the hydraulic machine as a pump during a vehicle braking event. During the braking event, the hydraulic machine is driven by the shaft, thereby providing pressurized fluid to at least the first accumulator to store the pressurized fluid. The hydraulic machine is operated to control the amount of fluid provided to the first accumulator during each cycle of the hydraulic machine during the braking event, thereby controlling the displacement of the hydraulic machine when operating as a pump. The hydraulic machine is operated as a motor during a vehicle driving event. During the vehicle driving event, the hydraulic machine is driven by pressurized fluid provided from at least the first accumulator, and thereby provides torque to the shaft. The hydraulic machine is operated to control the amount of fluid received from the first accumulator during each cycle of the hydraulic machine during the driving event. This controls the displacement of the hydraulic machine when operating as a motor.

Embodiments of the invention include a high pressure hydraulic pump/motor capable of operating at high speeds and with a variable output flow capability. Embodiments of the pump/motor provide the advantages of radial pistons in a compact design, the capability of disengaging the pistons to increase longevity, the capability to mount the pump/motor on an existing shaft with through-drive capability, and the capability to internally shift from pump function to motor function by re-indexing a rotating valve plate relative to a cam that either drives, or is driven by, the pistons.

Embodiments of the invention include a hydraulic machine that can be scaled to larger vehicles such as buses, medium-to-large trucks such as garbage trucks, and combat vehicles such as HumVee's. For these vehicles, it is desirable to mount a single hydraulic pump/motor on the propeller drive shaft, meaning that the unit will rotate at speeds approximately 3 to 4 times that of an axle mounted units. The invention modulates the power at the source, rather than using a separate transformer, thereby decreasing cost, reducing package size, and increasing efficiency.

To increase the operating speed, the number of cam lobes may be kept to a low number, for example, two, and a relatively short piston stroke can be maintained. Packaging in current vehicles, without major redesign and retooling of the major components, is considered a high priority. Thus, the present invention also allows for retrofit of existing vehicles. To accommodate larger vehicles, the size of the hydraulic machine can be increased; however, for propeller shaft mounting, or mounting on the transmission or transfer case, increasing the length of the hydraulic machine may be more desirable than increasing the girth (diameter). For this reason, additional banks of cylinders can be added.

In one embodiment, the hydraulic machine includes two banks of eight piston/cylinder combinations, with the second bank rotated 22.5 degrees to mount half way between the original 8 cylinders. Thus, with 16 equally spaced cylinders around the circle, angular spacing is 360/16 degrees—i.e., the pistons are spaced at 22.5 degree intervals. A cam for this machine may have two lobes, leading to 16 double power pulses per revolution (16×2/2). The duration of each intake stroke is one-half the cam increment; the other half of the duration is the exhaust stroke. The cam increment for a two lobe cam is 180 degrees, so the intake stroke duration is 90 degrees. With 16 pairs of power pulses per revolution, there are two new intake strokes beginning every 22.5 degrees, and lasting 90 degrees.

A rotating valve plate in the hydraulic machine cooperates with the cam to effect transitions from high pressure to low pressure, and from low pressure to high pressure. Although embodiments of the hydraulic machine described herein effect the pressure transitions by rotating the valve plate, other embodiments may effect the pressure transitions by other valve plate movements, such as translation, or a combination of rotation and translation. These pressure transitions can be considered as events, so that in the embodiment described above, there would be 4 events happening 16 times per revolution. The present invention includes a hydraulic machine having a means of varying the power output, effectively making it a variable displacement machine. For example, when the machine is operating as a pump, the rotating valve plate can be indexed slightly, so that the pressure transitions occur somewhere in mid-stroke, instead of at top dead center (TDC) or bottom dead center (BDC). This allows some of the high pressure fluid to be recirculated back into the cylinder before the pressure transition occurs, rather than having all of it expelled as when the transition to low pressure occurs at TDC.

Indexing meets the variable displacement requirement, but can cause a problem if there are four simultaneous pressure transitions, two high-to-low pressure, and two low-to-high pressure, with pistons in mid-stroke at some velocity, rather than when the piston velocity is approximately zero at top and bottom dead center. Each of the four events causes an interruption in the continuous flow every 22.5 degrees of rotation, and the four simultaneous interruptions are additive. To mitigate the disturbance, the cam and the valve plate can be modified slightly to re-index the four events so they do not occur simultaneously, but rather, occur at 22.5/4 degree increments, or every 5.625 degrees.

A two lobe cam typically consists of two increasing radius profiles of 90 degree duration each, and two decreasing radius profiles of 90 degree duration. To accomplish the event separation described above, and to space the events evenly, the four cam profiles are shortened by 5.625 degrees each, and a constant radius segment of 22.5 degrees is inserted in the cam to complete the circle. Three of the corresponding rotating valve ports are shortened by the same 5.625 degree increment, and the fourth port which synchronizes with the constant radius portion and an adjacent ramp, is increased by 16.875 degrees. With 16 equally spaced cylinders, two cam lobes with modified spacing, and pressure transitions occurring at the beginning and ending of each stroke, 64 events can now occur at even increments of 5.625 degrees.

For full displacement, the rotating valve plate, turning synchronously with the cam, is indexed to cause pressure transitions at top center of the cam profile and at bottom center of the cam profile. Indexing the rotating valve relative to the cam switches the machine from a pump to a motor, and vice versa when indexing in the opposite direction. With the cam lobe spacing described above, indexing to change the machine from a pump to a motor is 84.325 degrees, instead of 90 degrees for a machine having four synchronous events. To accomplish modulated performance when operating as either a pump or motor, the indexing of the rotating valve ports is at some lesser value—i.e., less than 84.325 degrees. The theoretical mode crossover from pump to motor occurs at 42.1625 degrees of indexing from top dead center of the cam, at which point all fluid is recirculated within the pump/motor, and there is no external flow.

The example described above with a hydraulic machine having 16 pistons and a two lobe cam is just one combination of elements in a hydraulic machine contemplated by the present invention. As described in more detail below, a hydraulic machine having two banks of seven pistons each, working in concert with a three lobe cam, is also an effective arrangement.

BRIEF DESCRIPTION OF THE DRAWINGS

FIGS. 5A-5D are front plan views showing the positions of the valve plate and cam relative to each other for four different operating modes of the hydraulic machine shown in FIGS. 2A and 2B;

FIGS. 6A-6B are front plan views of the valve plate positioned for two different operating modes of the hydraulic machine shown in FIGS. 2A and 2B; and FIGS. 7A-7D are velocity profiles of pistons and the cam of the hydraulic machine shown in FIGS. 2A and 2B.

DETAILED DESCRIPTION OF THE PREFERRED EMBODIMENT(S)

Figure 1:
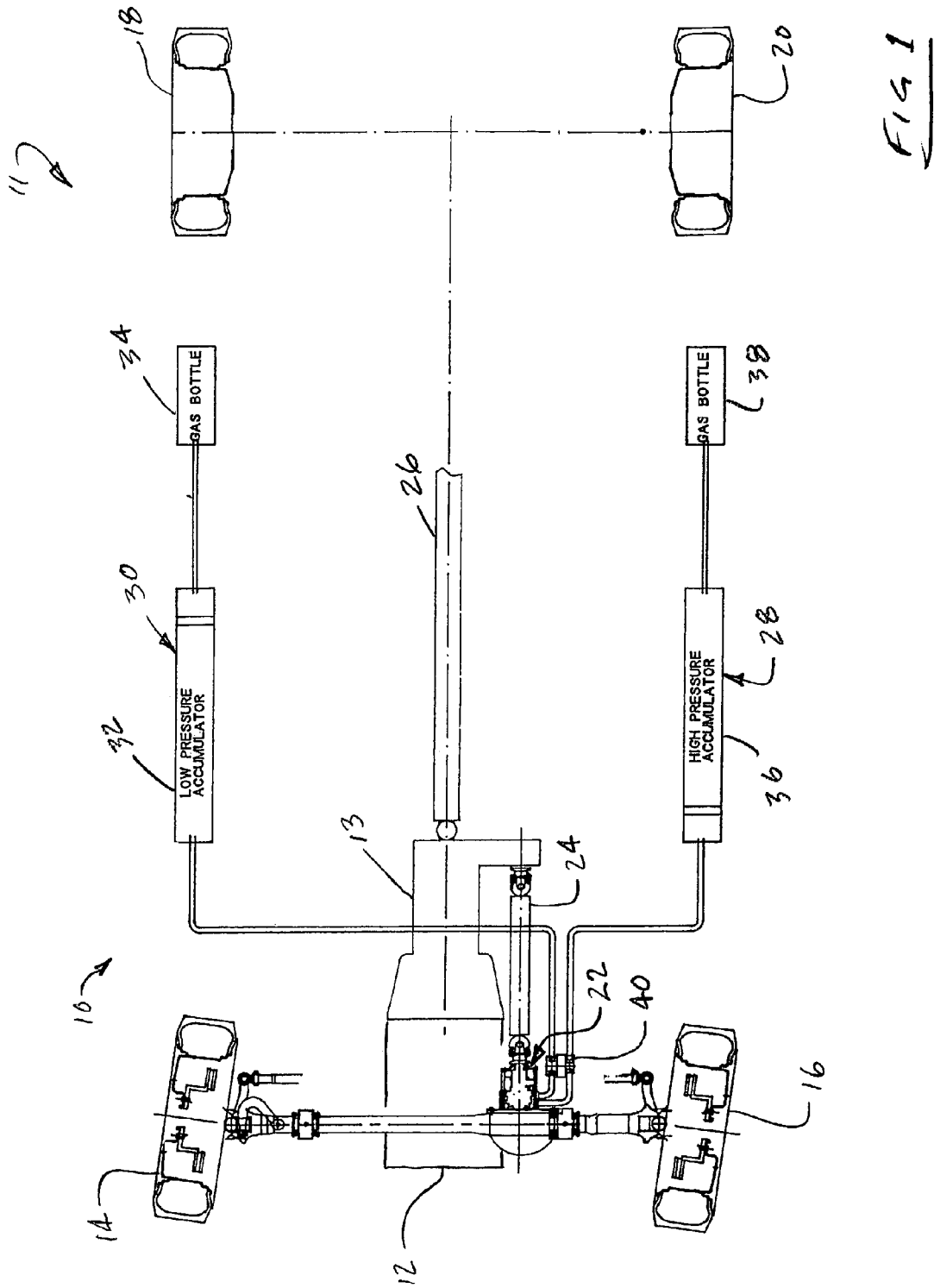
FIG. 1 is a schematic representation of a hydraulic regenerative braking system in accordance with one embodiment of the present invention.

FIG. 1 shows a schematic representation of one embodiment of a hydraulic regenerative braking system 10 for a vehicle 11 in accordance with the present invention. The vehicle 11 includes an engine 12, a transmission 13, and four wheels 14, 16, 18, 20. The regenerative braking system 10 includes a hydraulic machine, or pump/motor 22, connected to a front drive shaft 24. The present invention also contemplates the use of a hydraulic machine attached to a rear drive shaft, rather than a front drive shaft. Moreover, in other embodiments of the present invention, more than one pump/motor may be used, for example, a pump/motor attached to each of the front and rear drive shafts, or a respective pump/motor attached to front and/or rear half axle shafts.

The pump/motor 22 is operable to pump fluid into a first, or high pressure accumulator 28, where the high pressure fluid is stored for later use. The pump/motor 22 is also operable as a motor, driven by fluid from the high pressure accumulator 28. Thus, the braking energy stored in the high pressure accumulator 28 during a braking event is used to operate the pump/motor 22 as a motor to provide torque to the wheels 14, 16 during a driving event.

The regenerative braking system 10 also includes a second, or low pressure accumulator 30. The low pressure accumulator 30 provides a charge pressure—i.e., a relatively low pressure—to the pump/motor 22 to help ensure that there is always some liquid supplied to the pump/motor 22, thereby avoiding cavitation. The low pressure accumulator 30 includes two parts: a liquid/gas container 32, and a gas only container 34. Similarly, the high pressure accumulator 28 includes two parts: a liquid/gas container 36, and a gas only container 38. Configuring each of the accumulators 28, 30 with two containers facilitates packaging by reducing the size of each liquid/gas container 32, 36. Of course, high and low pressure accumulators, such as the high and low pressure accumulators 28, 30, may include a single liquid/gas container, rather than the two-part configuration shown in FIG. 1.

The two container arrangement takes advantage of residual volume for gas in the accumulator which is available after the accumulator piston (not shown) is at the end of its stroke. The gas only containers 34, 38 may be approximately 30% of the total respective accumulator volume, though different sizes of gas only containers may be used. To increase efficiency of the accumulators 28, 30, the gas side of each liquid/gas container 32, 36, and the gas only containers 34, 38, may be filled with an open cell foam, such as polyester, to help to ensure that compression and expansion of the gas occurs at constant temperature.

The regenerative braking system 10 also includes a control system, shown in FIG. 1 as a control module 40. The control module 40 receives inputs related to operation of the vehicle, and uses these inputs to control operation of the pump/motor 22. Such inputs may include driver initiated acceleration requests and braking requests, which may be input directly into the control module 40, or may be input from another controller, such as a vehicle system controller. In addition to electronic inputs, the control module 40 may also receive a number of hydraulic inputs (removed in FIG. 1 for clarity) to detect various fluid pressures in the system 10, and to help control operation of the pump/motor 22.

When the control module 40 is signaled to use regenerative braking during a braking event, it sends a control pressure to the pump/motor 22 to ensure that the pump/motor 22 operates as a pump. As explained more fully below, this involves appropriate positioning of components of the pump/motor 22 to ensure that fluid is pumped into the high pressure accumulator 28 as the pump/motor 22 is driven by the front drive shaft 24. Conversely, when the control module 40 is signaled to provide torque to the wheels 14, 16 during a driving event, it sends a control pressure to the pump/motor 22 to ensure that the pump/motor 22 operates as a motor. In this mode, fluid from the high pressure accumulator 28 drives the pump/motor 22 such that torque is provided to the wheels 14, 16.

Figures 2A, 2B:
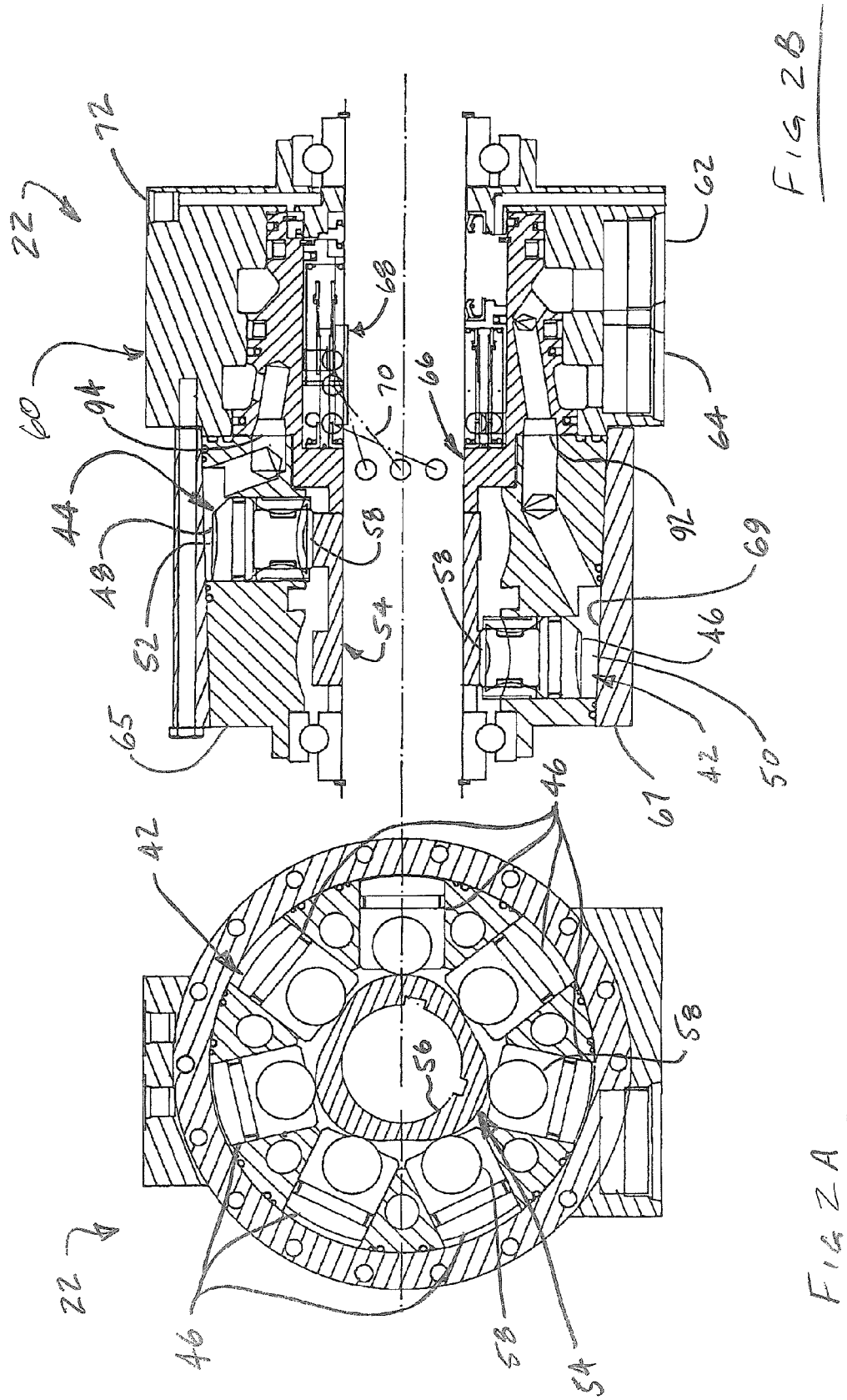
FIGS. 2A-2B are sectional views of a hydraulic machine used with the system shown in FIG. 1.

FIGS. 2A and 2B show sectional views of the pump/motor 22. As shown in FIG. 2B, the pump/motor 22 includes two banks 42, 44 of piston/cylinder combinations. As discussed above, hydraulic machines in accordance with the present invention can be configured with different numbers of piston/cylinder combinations as desired. As shown in FIG. 2A, the first bank 42 includes seven pistons 46 radially oriented around the pump/motor 22. Although only one piston 48 is shown in the second bank 44 in FIG. 2B, it is understood that the second bank 42 also includes seven of the pistons 48 radially oriented around the pump/motor 22. Also shown in FIG. 2B, each of the pistons 46 has a corresponding cylinder 50, and each of the pistons 48 has a corresponding cylinder 52.

The pump/motor 22 also includes a cam 54, having an aperture 56 configured to be keyed to the drive shaft 24. The cam 54 is configured to cooperate with cam followers 58 on each of the pistons 46, 48. Thus, the drive shaft 24 turns the cam 54 which operates the pistons 46, 48 to pump fluid to the high pressure accumulator 28 when the pump/motor 22 is operating as a pump—i.e., during vehicle braking. Conversely, when the pump/motor 22 is operating as a motor, the high pressure accumulator 28 provides fluid to the pump/motor 22 to operate the pistons 46, 48, which in turn rotate the cam 54 to provide torque to the drive shaft 24, and thus, the vehicle wheels 14, 16.

The pump/motor 22 includes a cylinder block, or housing 60, which includes a high pressure fluid port 62, and a low pressure fluid port 64. As shown in FIG. 2B, the housing 60 includes one portion 65 that contains the cylinders 50, 52, and another portion 67 that substantially surrounds the one portion 65 and includes a tapered bore 69. Although FIG. 2B shows the high pressure fluid port 62 connected only to the cylinders 50 in the first bank 42, and the low pressure fluid port 64 is shown in FIG. 2B connected only to the cylinders 52 in the second bank 44, it is understood that both the high and low pressure fluid ports 62, 64 are connected to the cylinders 50, 52 in each of the banks 42, 44. The high pressure fluid port 62 is connected to the high pressure accumulator 28, while the low pressure fluid port 64 is connected to the low pressure accumulator 30.

In order to facilitate a connection between the cylinders 50, 52 and the high and low pressure fluid ports 62, 64—and thus the high and low pressure accumulators 28, 30—the pump/motor 22 includes a valve plate 66. The valve plate 66 is also attached to the drive shaft 24, and rotates with it, making it movable relative to the housing 60. It is worth noting that in other embodiments, a cam and valve plate, such as the cam 54 and the valve plate 66, may not rotate with a driving shaft; rather, a pump/motor housing can rotate with the shaft, while the respective cam and valve plate are stationary—in such a case, the valve plate is still movable relative to the housing, though it is the housing that moves. Regardless of whether a cam and valve plate rotate with a driving shaft, they will rotate relative to each other. This provides a number advantages. First, it allows the pump/motor 22 to switch from a pump to a motor, and vice versa. Second, as explained more fully below, it allows pressure transitions within the cylinders 50, 52 to take place at different points in a respective piston stroke, thereby effecting operation of the pump/motor 22 as a variable displacement machine.

In order to effect movement of the valve plate 66 relative to the cam 54, the pump/motor 22 includes an axial piston 68. The piston 68 may be keyed or splined to the drive shaft 24. The piston 68 drives the valve plate 66 via one or more links 70, which are shown in phantom in FIG. 2B in three different positions. The links 70 translate the linear movement of the axial piston 68 into rotational movement of the valve plate 66. Movement of the axial piston 68 in one direction is effected by fluid entering the mode port 72. A spring (not shown) is provided to return the axial piston 68 to its previous position when the fluid pressure from the mode port 72 is exhausted.

Figure 3:
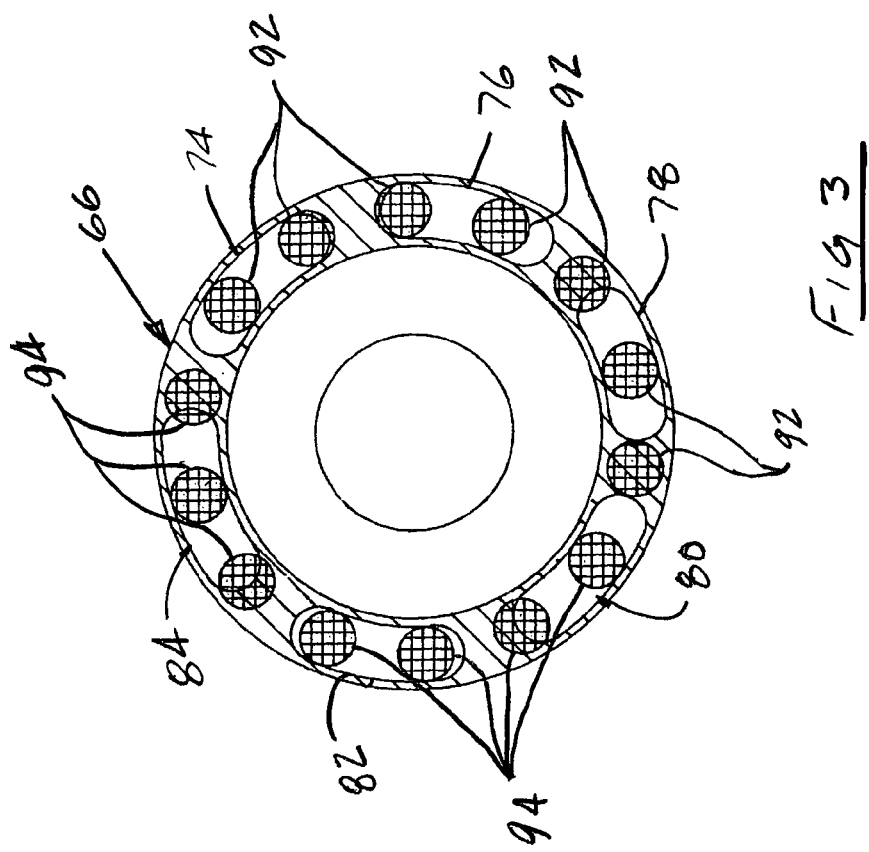
FIG. 3 is a sectional view of a valve plate and portion of a housing of the hydraulic machine shown in FIGS. 2A and 2B.

In order to facilitate a connection between the accumulators 28, 30 and the cylinders 50, 52 via the high and low pressure ports 62, 64, the valve plate 66 includes a number of apertures, or ports 74, 76, 78, 80, 82, 84—see FIG. 3. In the embodiment shown in FIGS. 2 and 3, the valve plate 66 has six ports 74, 76, 78, 80, 82, 84, which is two ports for each of three lobes 86, 88, 90 on the cam 54—see FIG. 4. Returning to FIG. 3, the valve plate 66 is shown juxtaposed over seven apertures 92 and seven other apertures 94 in the housing 60—see also FIG. 2B. Each of the apertures 92 is configured to facilitate fluid flow to and from the cylinders 50 in the first bank 42, while each of the apertures 94 is configured to facilitate fluid flow to and from the cylinders 52 in the second bank 44.

At any given moment while the pump/motor 22 is operating, half of the ports—for example, the ports 74, 78, 82—are connected to the high pressure fluid port 62, and thus the high pressure accumulator 28. At the same time, the other half of the ports—i.e., the ports 76, 80, 84—are connected to the low pressure fluid port 64, and thus the low pressure accumulator 30. Whether the pump/motor 22 is operating as a pump or a motor depends on where in the piston strokes the connection is made to the high and low pressure fluid ports 62, 64. For example, if the cylinders 50, 52 are connected to the high pressure fluid port 62 when the respective pistons 46, 48 are at TDC, and the cylinders 50, 52 are connected to the low pressure fluid port 64 when the respective pistons 46, 48 are at BDC, the pump/motor 22 will operate as a full displacement motor. Conversely, if the cylinders 50, 52 are connected to the high pressure fluid port 62 when the respective pistons 46, 48 are at BDC, and the cylinders 50, 52 are connected to the low pressure fluid port 64 when the respective pistons 46, 48 are at TDC, the pump/motor 22 will operate as a full displacement pump.

As discussed above, indexing the valve plate 66 relative to the cam 54 such that the transition from high pressure to low pressure takes place within the cylinders 50, 52 when the respective pistons 46, 48 are moving with some velocity—i.e., not at TDC or BDC—effects operation of the pump/motor 22 as a reduced displacement machine. To effect the indexing, the position of the valve plate 66, and thus the fluid ports 74, 76, 78, 80, 82, 84, is controlled relative to the position of the cam 54. FIGS. 5A-5D show the relative positions of the valve plate 66 and the cam 54 for four different operating modes. In each of these views, one of the pistons 48 is shown with its associated cam follower 58 engaging the cam 54, and each view shows the point at which the respective cylinder 50 (not shown) is connected to the high pressure fluid port 62.

In FIG. 5A, the valve plate 66 and cam 54 are aligned for operation of the pump/motor 22 as a full displacement pump. The cam 54 is at its lowest point, and the piston 46 is at BDC. At this point, the valve plate 66 connects the respective cylinder 50 with the high pressure fluid port 62. It is understood that each of the other six pistons 46 and each of the other seven pistons 48 will have their respective cylinders 50, 52 connected with the high pressure fluid port 62 when the respective pistons 46, 48 are at BDC.

FIG. 5B shows the piston 46 in the first half of its exhaust stroke—i.e., the profile of the cam 54 is increasing. Connecting the respective cylinder 50 to the high pressure fluid port 62 at this point also facilitates operation of the pump/motor 22 as a pump; however, this connection is made for only a portion of the exhaust stroke of the piston 46, and in particular for more than one-half the exhaust stroke, and so the output of the pump/motor 22 is reduced as compared to the operation shown in FIG. 5A. It is readily understood that the switch from the high pressure fluid port 62 to the low pressure fluid port 64 will occur when the piston 46 is at a corresponding point in its intake stroke.

FIG. 5C shows the piston 46 in the second half of its exhaust stroke, and like the other figures in this set of illustrations, it is assumed that the valve plate 66 connects the respective cylinder 50 to the high pressure fluid port 62 at this point in the piston stroke. This means that in FIG. 5C, the piston 46 will be connected to the high pressure fluid port 62 for only a portion, but for more than one-half, of its intake stroke, which occurs while the profile of the cam 54 is decreasing. Thus, in FIG. 5C, the pump/motor 22 is operating as a motor, but at reduced output, since the respective cylinder 50 was not connected to the high pressure fluid port 62 for the entire intake stroke of the piston 46. Finally, FIG. 5D shows the arrangement of the valve plate 66 and the cam 54 for operation of the pump/motor 22 as a full displacement motor. The piston 46 is shown in FIG. 5D at TDC, and the switch to high pressure in the respective cylinder 50 will allow the piston 46 to be connected to the high pressure fluid port 62 for the full length of its intake stroke.

Figure 4:
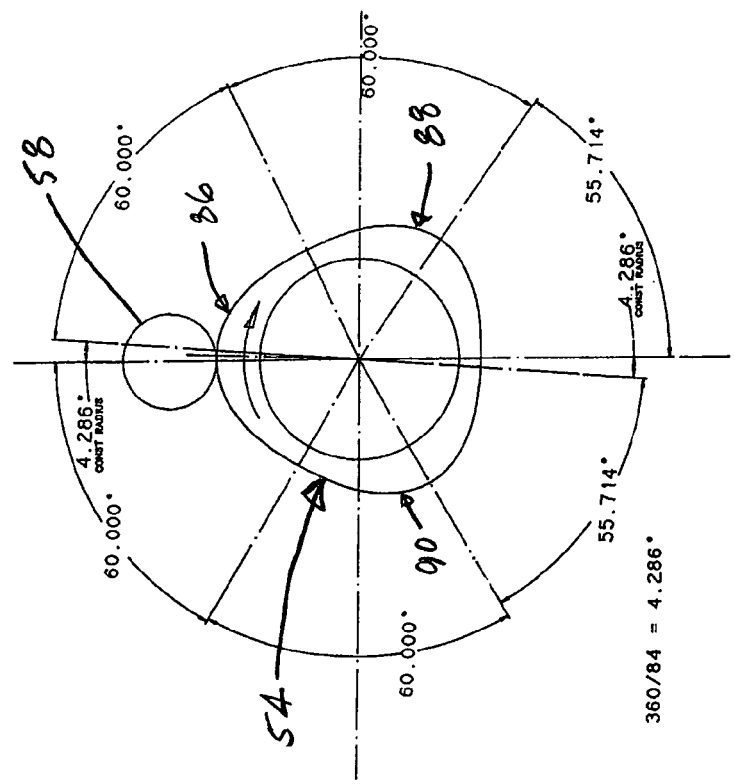
FIG. 4 is a front plan view of a cam and cam follower of the hydraulic machine shown in FIGS. 2A and 2B.

As described above, the valve plate 66 is indexed relative to the cam 54 to switch the operation of the pump/motor 22 from a pump to a motor—and vice versa. FIG. 4 shows the details of the cam profile, which includes the three lobes 86, 88, 90. With each cam of the cam lobes 86, 88, 90 having two segments, a working portion and a return portion, there are 84 events per revolution, or cycle, of the pump/motor 22 (14 pistons×3 lobes×2 lobe portions). When the pump/motor 22 is operating at full displacement, all pressure transitions (events) occur at TDC and at BDC. To have events equally spaced, there needs to be 360/84=4.29 degrees between events.

If a cam, such as the cam 54, was configured with six symmetric sections of 60 degrees each—three working and three return—and the six cam sections were matched up with six corresponding fluid ports of 60 degrees in a corresponding valve plate, and further matched up with fourteen equally spaced ports in the housing, two of the events would always occur simultaneously. To stagger the events, the cam 54 and the valve plate 66 have been configured asymmetrically. In particular, two of the cam segments are shortened from 60 degrees to 55.71 degrees, and two constant radius (dead spots) are added—one at TDC and one 180 degrees away at BDC—see FIG. 4. The two shortened cam segments straddle one of the constant radius segments, for example, the segment at BDC. On the valve plate 66, the port durations are modified to communicate with the cam; they are changed from six at 60 degrees, to: four at 60 degrees, one at 64.29 degrees, and one opposite at 55.71 degrees—see FIGS. 6A and 6B.

As described above, for a full displacement pump or motor, all pressure transitions occur at TDC and BDC when the piston velocity is approximately zero. For partial pump or motor displacement, however, the valve is indexed somewhere between TDC and BDC, so that pressure transitions do not occur at zero piston velocity. The total external flow (fluid velocity) is the algebraic sum of all piston velocities, positive and negative, indexed to all of the connected ports (high pressure or low pressure). As the cam rotates past the piston rollers (cam followers) one event at a time, the ports in the rotating valve plate do the same, and the maximum instantaneous flow change will be on the order of 17% (⅙) because half of the cylinders (seven) are connected to each of the external ports at any one time, but some of the seven are operating at less than full velocity. Small decreases from maximum flow will result in much less interruption in flow velocity than the 17% maximum because the interrupted port will be corresponding with a low piston velocity cylinder at the time.

An example is now provided to describe a transition from a full displacement pump—see FIGS. 4, 5A and 6A—to a full displacement motor—see FIGS. 4, 5D and 6B. Cam segments are numbered 1 through 6, and valve ports in the valve plate are labeled A through F. A single direction of rotation is assumed when describing "increasing" and "decreasing" cam segments.

Pump Full Displacement

| Cam Segment | | Valve Port | | |
|---|---|---|---|---|
| constant radius TDC | 4.29° | | | |
| 1 decreasing | 60° | A | low pressure | 64.29° |
| 2 increasing | 60° | B | high pressure | 60° |
| 3 decreasing | 55.71° | C | low pressure | 60° |
| constant radius BDC | 4.29° | | | |

-continued

| Cam Segment | | Valve Port | | |
|---|---|---|---|---|
| 4 increasing | 55.71° | D | high pressure | 55.71° |
| 5 decreasing | 60° | E | low pressure | 60° |
| 6 increasing | 60° | F | high pressure | 60° |

To switch to motor mode, the valve plate 66 is rotated 60 degrees relative to the cam 54.

Motor Full Displacement

| Cam Segment | | Valve Port | | |
|---|---|---|---|---|
| const rad TDC | 4.29° | | | |
| 1 decreasing | 60° | B | high pressure | 60° |
| 2 increasing | 60° | C | low pressure | 60° |
| 3 decreasing | 55.71° | D | high pressure | 55.71° |
| const rad BDC | 4.29° | | | |
| 4 increasing | 55.71° | E | low pressure | 60° |
| 5 decreasing | 60° | F | high pressure | 60° |
| 6 increasing | 60° | A | low pressure | 64.29° |

It can be seen that the short valve port always lines up with a short cam segment, the standard valve ports always line up with a standard cam segment or a short segment and a constant radius segment, and the long valve port always lines up with a standard cam segment and constant radius segment.

To further illustrate the different modes of operation of the pump/motor 22, FIGS. 7A-7D show velocity profiles for the cam 54 and the valve plate 66 for four different operating modes. As shown in FIGS. 7A and 7D, the transitions between high and low pressure occur at TDC and BDC when the pump/motor 22 is operating at full displacement. Conversely, the transitions occur in mid-stroke when the pump/motor 22 is operating at reduced displacement. In addition, FIG. 7A clearly illustrates how the various fluid ports 74, 76, 78, 80, 82, 84 line up with corresponding cam segments, such that an increasing or decreasing cam segment by itself, or combined with a constant radius segment, lines up with a fluid port of appropriate length.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A hydraulic regenerative braking system for a vehicle, the vehicle including a shaft connected to at least one wheel, the system comprising:
   a hydraulic machine operable as a pump configured to be driven by the shaft, thereby increasing the pressure of fluid flowing through the hydraulic machine, the hydraulic machine being further operable as a motor configured to be driven by pressurized fluid, thereby providing torque to the shaft, the hydraulic machine including:
   a housing including a high pressure fluid port and a low pressure fluid port,
   a plurality of radial pistons, each of the pistons being configured to reciprocate within a corresponding cylinder in the housing and having a corresponding piston stroke, the pistons pumping fluid when the hydraulic machine is operating as a pump, and providing torque when the hydraulic machine is operating as a motor, each of the pistons including a corresponding cam follower, a cam disposed within the housing, and having a plurality of lobes configured to cooperate with the cam followers to translate rotational motion of the cam into linear motion of the pistons when the hydraulic machine is operating as a pump, and to translate linear motion of the pistons into rotational motion of the cam when the hydraulic machine is operating as a motor, and a valve plate including a plurality of apertures therethrough, at least one of the apertures communicating with the high pressure fluid port and at least one other of the apertures communicating with the low pressure fluid port, the valve plate being configured to connect at least one of the cylinders with the high pressure fluid port and at least one other of the cylinders with the low pressure fluid port, the valve plate being movable relative to the housing to effect a first transition to disconnect the at least one cylinder from the high pressure fluid port and connect it with the low pressure fluid port, and to effect a second transition to disconnect the at least one other cylinder from the low pressure fluid port and connect it with the high pressure fluid port, the valve plate being movable such that the first and second transitions can be effected at a plurality of piston positions within a corresponding piston stroke, thereby facilitating variable displacement operation of the hydraulic machine.

2. The system of claim 1, wherein the first and second transitions are effected at different times, thereby reducing flow disturbances to the hydraulic machine.

3. The system of claim 2, wherein each of the cam lobes is defined by a lobe profile, and at least one of the cam lobes has a different profile than at least one other of the cam lobes, and wherein at least one of the apertures in the valve plate is configured differently than at least one other of the valve plate apertures, the cam lobes and the valve plate apertures cooperating to effect the first and second transitions at different times.

4. The system of claim 1, wherein the first and second transitions are effected substantially simultaneously.

5. The system of claim 1, wherein the valve plate is rotatable such that the at least one cylinder is connected to the high pressure fluid port for more than one-half of an intake stroke of a corresponding piston, while the at least one other cylinder is connected to the low pressure port for a corresponding length of an exhaust stroke of a corresponding piston, thereby facilitating operation of the hydraulic machine as a motor.

6. The system of claim 1, wherein the valve plate is rotatable such that the at least one cylinder is connected to the high pressure fluid port for more than one-half of an exhaust stroke of a corresponding piston, while the at least one other cylinder is connected to the low pressure port for a corresponding length of an intake stroke of a corresponding piston, thereby facilitating operation of the hydraulic machine as a pump.

7. The system of claim 1, wherein the hydraulic machine further includes an axial piston connected to the valve plate such that linear motion of the axial piston effects rotation of the valve plate relative to the cam.

8. The system of claim 1, wherein the cam includes an aperture therethrough for receiving the shaft, thereby facilitating rotation of the cam with the shaft.

9. A hydraulic regenerative braking system for a vehicle, the vehicle including a shaft connected to at least one wheel, the system comprising:

a first accumulator configured to receive fluid and store the fluid under pressure;

a second accumulator configured to store the fluid at a pressure lower than the pressure of the fluid in the first accumulator;

a hydraulic machine operable as a pump configured to be driven by energy received from the at least one wheel when the vehicle is braking, thereby facilitating storage of vehicle braking energy, the hydraulic machine being further operable as a motor configured to be driven by stored braking energy, thereby providing torque to the at least one wheel, the hydraulic machine being configured to pump fluid into the first accumulator when operating as a pump, and to receive fluid from the first accumulator when operating as a motor, the hydraulic machine being further configured such that the amount of fluid pumped into the first accumulator during each cycle of the hydraulic machine can be varied, and the amount of fluid received from the first accumulator during each cycle of the hydraulic machine can be varied, thereby facilitating operation of the hydraulic machine as a variable displacement pump and as a variable displacement motor, the hydraulic machine including:

a housing including a high pressure fluid port in communication with the first accumulator, and a low pressure fluid port in communication with the second accumulator, a plurality of pistons, each of the pistons being configured to reciprocate within a corresponding cylinder in the housing, the pistons pumping fluid into the first accumulator when the hydraulic machine is operating as a pump, and the pistons being driven by fluid from the first accumulator when the hydraulic machine is operating as a motor, a cam having a plurality of lobes configured to translate rotational motion of the cam into linear motion of the pistons when the hydraulic machine is operating as a pump, and to translate linear motion of the pistons into rotational motion of the cam when the hydraulic machine is operating as a motor, and a valve plate including a plurality of apertures therethrough, at least one of the apertures communicating with the high pressure fluid port and at least one other of the apertures communicating with the low pressure fluid port, the valve plate being configured to connect at least one of the cylinders with the high pressure fluid port and at least one other of the cylinders with the low pressure fluid port, the valve plate being rotatable relative to the cam to vary the amount of fluid pumped into the first accumulator during each cycle when the hydraulic machine is operating as a pump, and to vary the amount of fluid received from the first accumulator during each cycle when the hydraulic machine is operating as a motor; and a control system including at least one control module, the control system being configured to receive inputs related to the operation of the vehicle, and to control operation of the hydraulic machine.

10. The system of claim 9, the shaft being a drive shaft connected to two wheels, and wherein the hydraulic machine is driven by the shaft when operating as a pump, and drives the shaft when operating as a motor.

11. The system of claim 9, wherein the valve plate is rotatable to effect a first transition to disconnect the at least one cylinder from the high pressure fluid port and connect it with the low pressure fluid port, and to effect a second transition to disconnect the at least one other cylinder from the low pressure fluid port and connect it with the high pressure fluid port, the valve plate being rotatable such that the first and second transitions can be effected at any of a plurality of piston positions within a corresponding piston stroke, thereby varying the amount of fluid pumped into the first accumulator during each cycle when the hydraulic machine is operating as a pump, and varying the amount of fluid received from the first accumulator during each cycle when the hydraulic machine is operating as a motor.

12. The system of claim 11, wherein the first and second transitions are effected substantially simultaneously.

13. The system of claim 11, wherein each of the cam lobes is defined by a lobe profile, and at least one of the cam lobes has a different profile than at least one other of the cam lobes, and wherein at least one of the apertures in the valve plate is configured differently than at least one other of the valve plate apertures, the cam lobes and the valve plate apertures cooperating to effect the first and second transitions at different times, thereby reducing flow disturbances to the hydraulic machine.

14. The system of claim 11, wherein the valve plate is rotatable such that the at least one cylinder is connected to the high pressure fluid port for more than one-half of an intake stroke of a corresponding piston, while the at least one other cylinder is connected to the low pressure port for a corresponding length of an exhaust stroke of a corresponding piston, thereby facilitating operation of the hydraulic machine as a motor.

15. The system of claim 11, wherein the valve plate is rotatable such that the at least one cylinder is connected to the high pressure fluid port for more than one-half of an exhaust stroke of a corresponding piston, while the at least one other cylinder is connected to the low pressure port for a corresponding length of an intake stroke of a corresponding piston, thereby facilitating operation of the hydraulic machine as a pump.

16. A method for hydraulic regenerative braking of a vehicle, the vehicle including a shaft connected to at least one wheel, first and second accumulators for storing and providing pressurized fluid, and further including a hydraulic machine operable as a pump configured to receive energy from the at least one wheel and pump fluid into the first accumulator, and further operable as a motor to receive pressurized fluid from the first accumulator and provide energy to the at least one wheel, the hydraulic machine including a housing including a high pressure fluid port in communication with the first accumulator, and a low pressure fluid port in communication with the second accumulator, a plurality of pistons, each of the pistons being configured to reciprocate within a corresponding cylinder in the housing, a cam for driving and being driven by the pistons, and a valve plate including a plurality of apertures therethrough, at least one of the apertures communicating with the high pressure fluid port and at least one other of the apertures communicating with the low pressure fluid port, the method comprising:

operating the hydraulic machine as a pump during a vehicle braking event, the hydraulic machine being driven by the shaft, thereby providing pressurized fluid to at least the first accumulator to store the pressurized fluid;

operating the hydraulic machine to control the amount of fluid provided to the first accumulator during each cycle of the hydraulic machine during the braking event, thereby controlling the displacement of the hydraulic machine when operating as a pump;

operating the hydraulic machine as a motor during a vehicle driving event, the hydraulic machine being driven by pressurized fluid provided from at least the first accumulator, thereby providing torque to the shaft;

operating the hydraulic machine to control the amount of fluid received from the first accumulator during each cycle of the hydraulic machine during the driving event, thereby controlling the displacement of the hydraulic machine when operating as a motor;

positioning the valve plate such that at least one of the cylinders is connected with the high pressure fluid port and at least one other of the cylinders is connected with the low pressure fluid port;

rotating the valve plate relative to the cam to vary the amount of fluid pumped into the first accumulator during each cycle when the hydraulic machine is operating as a pump; and rotating the valve plate relative to the cam to vary the amount of fluid received from the first accumulator during each cycle when the hydraulic machine is operating as a motor.

17. The method of claim 16, further comprising:

rotating the valve plate to disconnect the at least one cylinder from the high pressure fluid port and connect it with the low pressure fluid port to effect a first transition; and rotating the valve plate to disconnect the at least one other cylinder from the low pressure fluid port and connect it with the high pressure fluid port to effect a second transition.

18. The method of claim 17, wherein the first and second transitions are effected at different times.

19. A hydraulic machine, comprising:

a housing including one portion having a plurality of radially oriented cylinders disposed therein, and another portion configured to be disposed substantially around the one portion and including a tapered bore, and further including a high pressure fluid port and a low pressure fluid port;

a plurality of pistons, each of the pistons being configured to reciprocate within a corresponding cylinder in the housing and having a corresponding piston stroke, each of the pistons including a corresponding cam follower;

a cam disposed within the housing, and having a plurality of lobes configured to cooperate with the cam followers such that effecting a relative rotational motion between the cam and the housing effects linear motion of the pistons, and effecting linear motion of the pistons effects a relative rotational motion between the cam and the housing; and a valve plate including a plurality of apertures therethrough, at least one of the apertures communicating with the high pressure fluid port and at least one other of the apertures communicating with the low pressure fluid port, the valve plate being configured to connect at least one of the cylinders with the high pressure fluid port and at least one other of the cylinders with the low pressure fluid port, the valve plate being movable relative to the housing to effect a first transition to disconnect the at least one cylinder from the high pressure fluid port and connect it with the low pressure fluid port, and to effect a second transition to disconnect the at least one other cylinder from the low pressure fluid port and connect it with the high pressure fluid port, the valve plate being movable such that the first and second transitions can be effected at a plurality of piston positions within a corresponding piston stroke, thereby facilitating variable displacement operation of the hydraulic machine.

20. The hydraulic machine of claim 19, wherein the cam is configured to be substantially rotationally stationary, such that relative rotational motion between the cam and the housing is effected by rotation of the housing.

21. The hydraulic machine of claim 19, wherein the housing is configured to be substantially rotationally stationary, such that relative rotational motion between the cam and the housing is effected by rotation of the cam.

22. The hydraulic machine of claim 19, wherein the hydraulic machine further includes a piston cooperating with the valve plate such that linear motion of the piston effects rotation of the valve plate relative to the cam.

23. The hydraulic machine of claim 22, wherein the piston cooperating with the valve plate is axially oriented relative to the valve plate.

24. A hydraulic machine, comprising:
a housing having a plurality of radially oriented cylinders disposed therein, and including a high pressure fluid port and a low pressure fluid port, the housing being configured to be substantially rotationally stationary, such that relative rotational motion between the cam and the housing is effected by rotation of the cam;
a plurality of pistons, each of the pistons being configured to reciprocate within a corresponding cylinder in the housing and having a corresponding piston stroke, each of the pistons including a corresponding cam follower;
a cam disposed within the housing, and having a plurality of lobes configured to cooperate with the cam followers such that effecting a relative rotational motion between the cam and the housing effects linear motion of the pistons, and effecting linear motion of the pistons effects a relative rotational motion between the cam and the housing; and
a valve plate including a plurality of apertures therethrough, at least one of the apertures communicating with the high pressure fluid port and at least one other of the apertures communicating with the low pressure fluid port, the valve plate being configured to connect at least one of the cylinders with the high pressure fluid port and at least one other of the cylinders with the low pressure fluid port, the valve plate being movable relative to the housing to effect a first transition to disconnect the at least one cylinder from the high pressure fluid port and connect it with the low pressure fluid port, and to effect a second transition to disconnect the at least one other cylinder from the low pressure fluid port and connect it with the high pressure fluid port, the valve plate being movable such that the first and second transitions can be effected at a plurality of piston positions within a corresponding piston stroke, thereby facilitating variable displacement operation of the hydraulic machine.

25. A hydraulic machine, comprising:
a housing having a plurality of radially oriented cylinders disposed therein, and including a high pressure fluid port and a low pressure fluid port;
a plurality of pistons, each of the pistons being configured to reciprocate within a corresponding cylinder in the housing and having a corresponding piston stroke, each of the pistons including a corresponding cam follower;
a cam disposed within the housing, and having a plurality of lobes configured to cooperate with the cam followers such that effecting a relative rotational motion between the cam and the housing effects linear motion of the pistons, and effecting linear motion of the pistons effects a relative rotational motion between the cam and the housing;
a valve plate including a plurality of apertures therethrough, at least one of the apertures communicating with the high pressure fluid port and at least one other of the apertures communicating with the low pressure fluid port, the valve plate being configured to connect at least one of the cylinders with the high pressure fluid port and at least one other of the cylinders with the low pressure fluid port, the valve plate being movable relative to the housing to effect a first transition to disconnect the at least one cylinder from the high pressure fluid port and connect it with the low pressure fluid port, and to effect a second transition to disconnect the at least one other cylinder from the low pressure fluid port and connect it with the high pressure fluid port, the valve plate being movable such that the first and second transitions can be effected at a plurality of piston positions within a corresponding piston stroke, thereby facilitating variable displacement operation of the hydraulic machine; and
a piston cooperating with the valve plate such that linear motion of the piston effects rotation of the valve plate relative to the cam.

* * * * *